United States Patent
Tsien et al.

(10) Patent No.: US 12,001,265 B2
(45) Date of Patent: Jun. 4, 2024

(54) DEVICE AND METHOD FOR REDUCING SAVE-RESTORE LATENCY USING ADDRESS LINEARIZATION

(71) Applicant: Advanced Micro Devices, Inc., Santa Clara, CA (US)

(72) Inventors: Benjamin Tsien, Santa Clara, CA (US); Alexander J. Branover, Boxborough, MA (US); Christopher T. Weaver, Boxborough, MA (US); Indrani Paul, Austin, TX (US); Mihir Shaileshbhai Doctor, Santa Clara, CA (US); John P. Petry, San Diego, CA (US); Stephen V. Kosonocky, Fort Collins, CO (US); Thomas J. Gibney, Boxborough, MA (US); Jose G. Cruz, Boxborough, MA (US); Pravesh Gupta, Bangalore (IN); Chintan S. Patel, Austin, TX (US)

(73) Assignee: Advanced Micro Devices, Inc., Santa Clara, CA (US)

( * ) Notice: Subject to any disclaimer, the term of this patent is extended or adjusted under 35 U.S.C. 154(b) by 79 days.

(21) Appl. No.: 17/483,694

(22) Filed: Sep. 23, 2021

(65) Prior Publication Data

US 2023/0090126 A1    Mar. 23, 2023

(51) Int. Cl.
  *G06F 1/00*    (2006.01)
  *G06F 1/3234*    (2019.01)
  *G06F 3/06*    (2006.01)
  *G06F 11/14*    (2006.01)

(52) U.S. Cl.
  CPC .......... *G06F 1/3275* (2013.01); *G06F 1/3265* (2013.01); *G06F 3/0625* (2013.01); *G06F 3/0635* (2013.01); *G06F 3/0673* (2013.01); *G06F 11/1469* (2013.01); *G06F 2201/84* (2013.01)

(58) Field of Classification Search
  CPC .... G06F 1/3275; G06F 1/3265; G06F 3/0625; G06F 3/0635; G06F 3/0673; G06F 11/1469; G06F 2201/84; G06F 1/3243; G06F 12/00; G06F 1/3203; Y02D 10/00
  See application file for complete search history.

(56) References Cited

U.S. PATENT DOCUMENTS

| | | | |
|---|---|---|---|
| 6,243,831 B1 * | 6/2001 | Mustafa | G06F 1/30 714/24 |
| 10,403,351 B1 | 9/2019 | Tsien et al. | |
| 2012/0198112 A1 | 8/2012 | Tiwari | |
| 2017/0108911 A1 | 4/2017 | Chun et al. | |
| 2017/0108914 A1 | 4/2017 | Chun et al. | |
| 2017/0109090 A1 | 4/2017 | Chun et al. | |
| 2019/0114105 A1 | 4/2019 | Cho | |
| 2019/0259448 A1 * | 8/2019 | Tsien | G06F 1/3287 |
| 2023/0031388 A1 * | 2/2023 | Tsien | G06F 1/3287 |

* cited by examiner

*Primary Examiner* — Xuxing Chen

(74) *Attorney, Agent, or Firm* — Volpe Koenig

(57) ABSTRACT

Devices and methods for transitioning between power states of a device are provided. A program is executed using data stored in configuration registers assigned to a component of a device. For a first reduced power state, data of a first portion of the configuration registers is saved to the memory using a first set of linear address space. For a second reduced power state, data of a second portion of the configuration registers is saved to the memory using a second set of linear address space and data of a third portion of the configuration registers is saved to the memory using a third set of linear address space.

21 Claims, 7 Drawing Sheets

DEVICE AND METHOD FOR REDUCING SAVE-RESTORE LATENCY USING ADDRESS LINEARIZATION

BACKGROUND

Computing systems are increasingly integrating large numbers of different types of components on a single chip or on multi-chip modules. The complexity and power consumption of a device increases with the number of different types of components. Power management is an important aspect of the design and operation of integrated circuits, especially circuits that are integrated within devices which typically rely on battery power, such as mobile devices. Reducing power consumption in the integrated circuits of these devices can increase the life of the battery as well as decrease the heat generated by the integrated circuits.

BRIEF DESCRIPTION OF THE DRAWINGS

A more detailed understanding can be had from the following description, given by way of example in conjunction with the accompanying drawings wherein.

DETAILED DESCRIPTION

Figure 1:
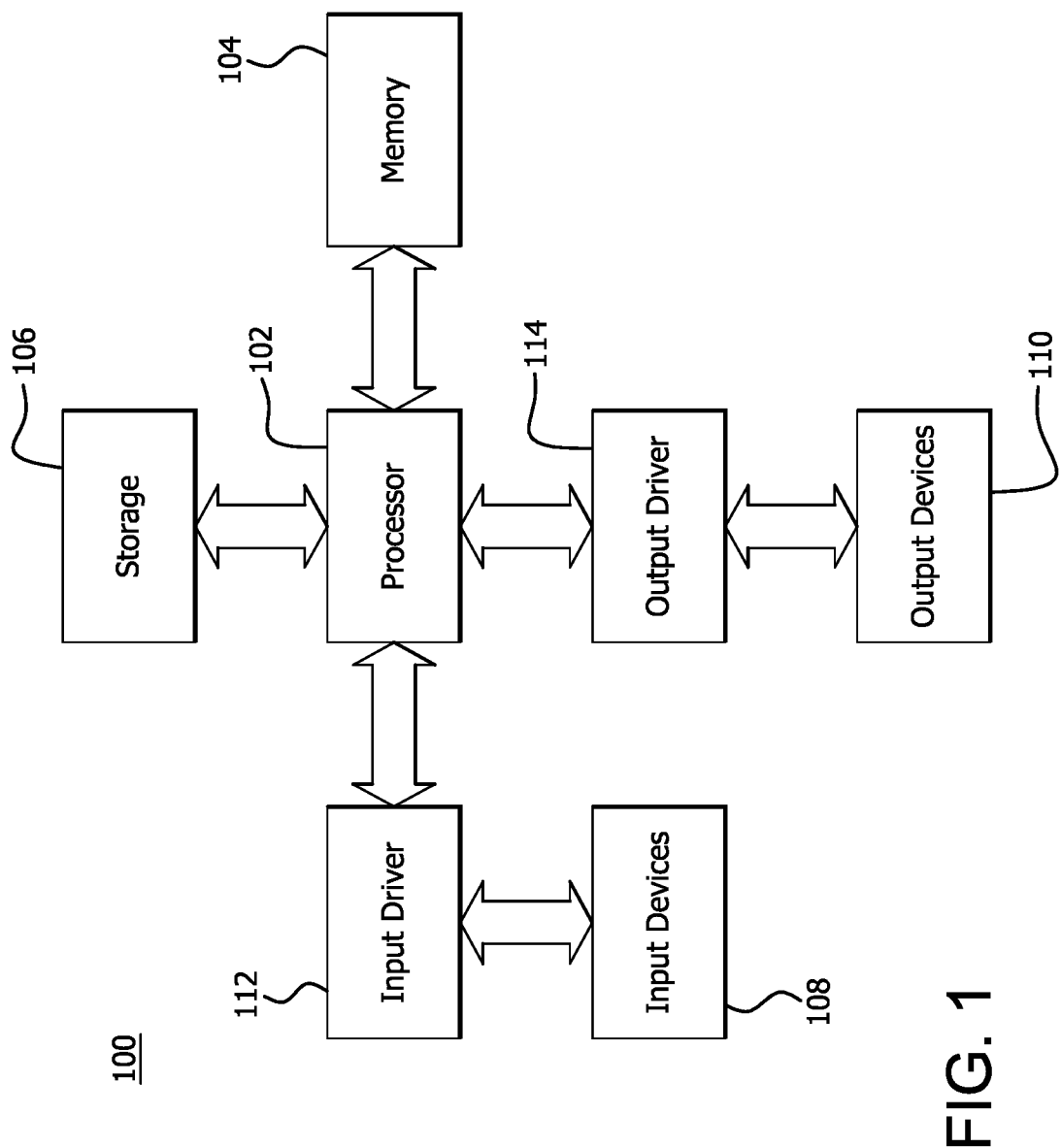
FIG. 1 is a block diagram of an example device in which one or more features of the disclosure can be implemented.

Some conventional devices reduce power consumption by entering a reduced power state (i.e., a power-gating state), which is a state in which a device or one or more components of the device are operating in a mode which consumes less power than another operating mode. For example, the power that would ordinarily be used to retain a present power state is removed from one or more components to enter the power-gating state and consume less power. A reduced power state is entered, for example, by turning off or removing power to a component, or alternatively, reducing a power supply voltage and/or reducing a clock frequency supplied to a component.

A configuration register state refers to the values stored in a plurality of configuration registers (also referred to herein as registers), assigned to a component of a device, which identify the component, define various features of the component, and allow system software to interface with and/or control the operation of the component. Prior to entering a reduced power state, a configuration register state (i.e., values of data in the configuration registers) is saved to memory (e.g., dynamic random-access memory (DRAM)). The registers assigned to a component include any number and type of registers, such as routing tables, address maps, configuration data, buffer allocation information, including flow control credits (e.g., when a first component communicates its buffer counts to a second component during initialization, such that the second component has an indication of a number of packets that can be sent to the first component without pausing and waiting for the buffers to be freed up), performance registers and debug related registers.

The operating system, device drivers, and diagnostic software typically access the configuration register state during operation of the given component. Upon exiting the reduced power state, the configuration register state is restored. Saving and restoring the configuration register state prevents the occurrence of computing errors resulting from incorrect data being stored during execution.

Saving the configuration register state to memory each time the system enters the reduced power state causes a delay which reduces the total amount of time spent in the reduced power state. Also, writing the configuration register state to memory incurs a power use penalty.

Further, saving the configuration register state, which includes saving the data to memory in the correct sequence in which it is stored, is often processed inefficiently. For example, if 5 of 16 assigned registers (i.e., assigned to a component) are being used, then time and resources are wasted on saving data for 11 unused registers. Alternatively, if instances are being used for an address block and different numbers of instances are being used for different types (e.g., generations) of systems on chip (SOC), additional time and resources can be wasted. For example, if 3 copies of a coherent agent are used for one SOC and 6 copies of the coherent agent are used for another SOC, 6 copies are saved.

Some conventional systems seek to avoid this inefficiency by using linear addressing, which creates an alternate decode by adding a second address for a register in another address space. Then, if the second address matches the first address (i.e., the normal address), the register is accessed. That is, the registers of an SOC are linearized by stitching the registers together during compiling.

For example, as described in U.S. Pat. No. 10,403,351, which is incorporated herein by reference in its entirety, after exiting a reduced power state, changes made to the configuration registers assigned to a component are tracked and, upon entering a reduced power state, the component writes the configuration registers determined to have changed. The changes made to the configuration registers are tracked by identifying addresses of the registers, mapping the configuration registers (e.g., mapping register addresses or register identifiers of the configuration registers) to contiguous addresses within a linear address space, and then tracking the configuration registers mapped to the contiguous addresses in the linear address space.

For the example described above, if 5 of 16 assigned registers are being used, the contiguous addresses within the linear address space can include a first address block which starts at address 0 and ends at address 4 (for the 5 used registers) and a second address block can be used which starts at address 5 and ends at address 15 (for the unused registers). The addresses in the linear address space are mapped to memory for storing and restoring the configuration registers upon entry and exit to and from a reduced power state.

In one example, a linear address is generated for each instance of a component. For example, if 4 registers and two instances are used, the linear address of the component includes an address range of 4 bytes (e.g., byte 0 to byte 3), where the first instance includes a starting address of byte 0 and the second instance includes a starting address of byte 4. Accordingly, the instanced component is not aware of other instances of itself, provided each receives a value (e.g., strap value) of its starting address that can be added to the linear address starting with byte 0.

Alternatively, when multiple instances are used multiple times, a consecutive range of addresses is generated (e.g., from address 0 to address 16). Then, when the configuration register state is saved, the data is read from address 0 to address 16 and, for restore, the data is read from memory and written to registers from 0 to 16.

Linear addressing avoids the inefficiencies associated with the save and restore by using burst accesses to read and write the data. For example, linear addressing reduces power consumption by avoiding the use of firmware or a processor to prevent gaps between register addresses and saving unused data. In addition, the use of linear addressing increases the overall performance because the burst accesses facilitate faster exit from the reduced power state to the active state to execute the program.

These conventional linear addressing techniques, however, implement a single linear address map for saving and restoring the configuration register state when transitioning between different reduced power states. These reduced power states include different levels, however, in which the power supplied to different components of the device is varied. For example, in some reduced power states (e.g., shallower reduced power states, such as Z1-Z9 power states), power is supplied to one or more components having configuration register states to be saved and restored, while in other deeper reduced power states (e.g., Z10 power state), power is not supplied to any of these components. That is, in the shallower reduced power states, a portion of the registers (i.e., registers corresponding to the powered on components) are saved and restored while a remaining portion of the registers are not saved and restored. In the deeper reduced power states, registers for one or more components that are powered on in a shallower state, are not to be saved and restored because these components are not active in the deeper reduced power states.

Features of the present disclosure provide efficient transitioning between different levels of reduced power states by saving and restoring data of different portions of configuration registers assigned to a component using multiple sets of linear address spaces (i.e., multiple sets of contiguous addresses) which are hardcoded in the configuration registers and mapped to the register addresses assigned to the different portions of configuration registers (i.e., register addresses or register identifiers assigned to the configuration registers according to a specification or standard (e.g., PCI Express)). That is, the sets of linear address spaces and the assigned register addresses are both hardcoded in the registers. The sets of linear address spaces for the portions of the registers are then mapped to logical addresses (i.e., virtual addresses) in memory.

The mapping of the assigned register addresses to the sets of contiguous addresses is performed at compiling (i.e., by a compiler) such that the data of the configuration registers is efficiently saved, by a processor (e.g., a power management controller), to memory and restored, by the processor, to the configuration registers from memory during operation of a device. In addition, the mapping of the assigned register addresses (i.e., mapping the assigned configuration registers) to the sets of contiguous addresses is performed without any additional decoding hardware (i.e., using a single decoder). A first set of linear address space (i.e., a first set of contiguous addresses) is used for shallower reduced power states (e.g., Z1-Z7 power states). A second set of linear address space and a third set of linear address space (i.e., second and third sets of contiguous addresses) are used for deeper reduced power states (e.g., Z8-Z10 or deeper power states).

First and second portions of the configuration registers (i.e., the addresses or identifiers of the first and second portions of the configuration registers) assigned to a component are mapped to the first and second sets of linear address spaces, respectively, to access addresses corresponding to DRAM. That is, data from the first and second portions of the configuration registers are saved to addresses in memory corresponding to physical locations of DRAM using the first and second mapped sets of contiguous addresses and the data is restored to the first and second portions of the configuration registers from DRAM using the first and second mapped sets of contiguous addresses.

Throughout each of the reduced power states, however, power continues to be supplied to a portion of SRAM in the memory. Accordingly, before entering a reduced power state in which power is removed from the first and second portions of the configuration registers assigned to the component, data from a third portion of the configuration registers assigned to the component is mapped to a third set of linear address space and saved at memory addresses corresponding to the portion of SRAM such that when power is restored to each portion of the configuration registers, the data in the third portion of the configuration registers, mapped to the third set of linear address space is used by the processor to correctly and reliably restore the data from DRAM to the first and second portions of the configuration registers.

For example, the data from the portion of the configuration registers mapped to the third address and saved to SRAM indicates, to a power management controller, how to access DRAM, where the data for the first and second portions of the configuration registers is located in DRAM, how to buffer the data to and from DRAM, and provides confirmation that the data saved to DRAM is the data being restored to the registers. This data includes, for example, data related to at least one of routing tables, address maps, flow control credits and reliability accessibility serviceability (RAS) configuration. That is, for the deeper reduced power states, the data in the third portion of the configuration registers is saved to SRAM to correctly and reliably save and restore the data from the first and second portions of the configuration registers, but the data in the first and second portions of the configuration registers are not saved to SRAM. Accordingly, the cost (e.g., area and power consumption) associated with SRAM access is reduced.

The data in an assigned configuration register is saved to memory a single time before power is removed and is then restored when power is restored to that register. That is, after the data in an assigned configuration register is saved to memory and power to the register is removed to enter a reduced power state (e.g., transition from an active state to a reduced power state or transition from a shallower reduced power state to a deeper reduced power state), the data for that configuration register is not resaved upon entering a deeper reduced power state because power to the register remains off. Upon reentering a power state in which power is resupplied to the configuration register, the data is restored to the configuration register from the address (i.e., location) in memory.

One or more registers assigned to a component may be powered off before entering a reduced power state while power continues to be supplied to one or more other registers assigned to the component when entering the reduced power state. For example, when transitioning from an active power state to a first reduced power state, power to a first register assigned to a component may be removed while power continues to be supplied to a second register. Accordingly, the data from the first register is saved to an address in memory using the mapped address in the linear address space of the first register.

However, the data for the second register is not saved to memory while power continues to be supplied to the second register. When transitioning from the first reduced power state (e.g., a shallower reduced power state) to a second reduced power state (e.g., deeper reduced power state), the power supplied to a second register assigned to the component may be removed. Accordingly, the data from the second register is saved to another address in memory using the mapped address of the second register. The data for the first register is restored to the first register from memory, using its corresponding address mapped to the linear address space, when reentering any power state in which power is resupplied to the first register and the data for the second register is restored to the second register from memory, using its corresponding address mapped to the linear address space, when reentering any power state in which power is resupplied to the second register.

A processing device is provided which comprises memory and a component, having assigned configuration registers, configured to execute a program using data stored in the assigned configuration registers. The processing device also comprises a power management controller configured to, for a first reduced power state, save the data of a first portion of the configuration registers to the memory and restore the data from the memory to the first portion of assigned configuration registers using a first set of linear address space, save the data of a second portion of the configuration registers to the memory using a second set of linear address space and save the data of a third portion of the configuration registers to the memory using a third set of linear address space.

A method of transitioning between power states of a device is provided. The method comprises executing a program using data stored in configuration registers and for a first reduced power state, saving data of a first portion of configuration registers to memory using a first set of linear address space. The method also comprises, for a second reduced power state, saving data of a second portion of the configuration registers to the memory using a second set of linear address space and saving data of a third portion of the configuration registers to the memory using a third set of linear address space. The configuration registers are assigned to a component of the device.

A non-transitory computer readable medium is provided which comprises instructions for causing a computer to execute a method of linear addressing. The instructions comprise executing a program using data stored in configuration registers and for a first reduced power state, saving data of a first portion of configuration registers to memory using a first set of linear address space. The instructions also comprise, for a second reduced power state, saving data of a second portion of the configuration registers to the memory using a second set of linear address space and saving data of a third portion of the configuration registers to the memory using a third set of linear address space. The configuration registers are assigned to a component of the device.

FIG. 1 is a block diagram of an example device 100 in which one or more features of the disclosure can be implemented. The device 100 can include, for example, a computer, a gaming device, a handheld device, a set-top box, a television, a mobile phone, or a tablet computer. The device 100 includes a processor 102, a memory 104, a storage 106, one or more input devices 108, and one or more output devices 110. The device 100 can also optionally include an input driver 112 and an output driver 114. It is understood that the device 100 can include additional components not shown in FIG. 1.

In various alternatives, the processor 102 includes a central processing unit (CPU), a graphics processing unit (GPU), a CPU and GPU located on the same die, one or more processor cores, wherein each processor core can be a CPU or a GPU, or a power management controller (PMC) used to manage different powers states of the device 100, such as reduced power states when the device 100 or a component of the device 100 is operating in a mode which consumes less power than a normal operating mode. In various alternatives, the memory 104 is be located on the same die as the processor 102, or is located separately from the processor 102. The memory 104 includes a volatile or non-volatile memory, for example, random access memory (RAM), dynamic RAM (DRAM), or a cache.

The storage 106 includes a fixed or removable storage, for example, a hard disk drive, a solid state drive, an optical disk, or a flash drive. The input devices 108 include, without limitation, a keyboard, a keypad, a touch screen, a touch pad, a detector, a microphone, an accelerometer, a gyroscope, a biometric scanner, or a network connection (e.g., a wireless local area network card for transmission and/or reception of wireless IEEE 802 signals). The output devices 110 include, without limitation, a display, a speaker, a printer, a haptic feedback device, one or more lights, an antenna, or a network connection (e.g., a wireless local area network card for transmission and/or reception of wireless IEEE 802 signals).

The input driver 112 communicates with the processor 102 and the input devices 108, and permits the processor 102 to receive input from the input devices 108. The output driver 114 communicates with the processor 102 and the output devices 110, and permits the processor 102 to send output to the output devices 110. It is noted that the input driver 112 and the output driver 114 are optional components, and that the device 100 will operate in the same manner if the input driver 112 and the output driver 114 are not present.

Figure 2:
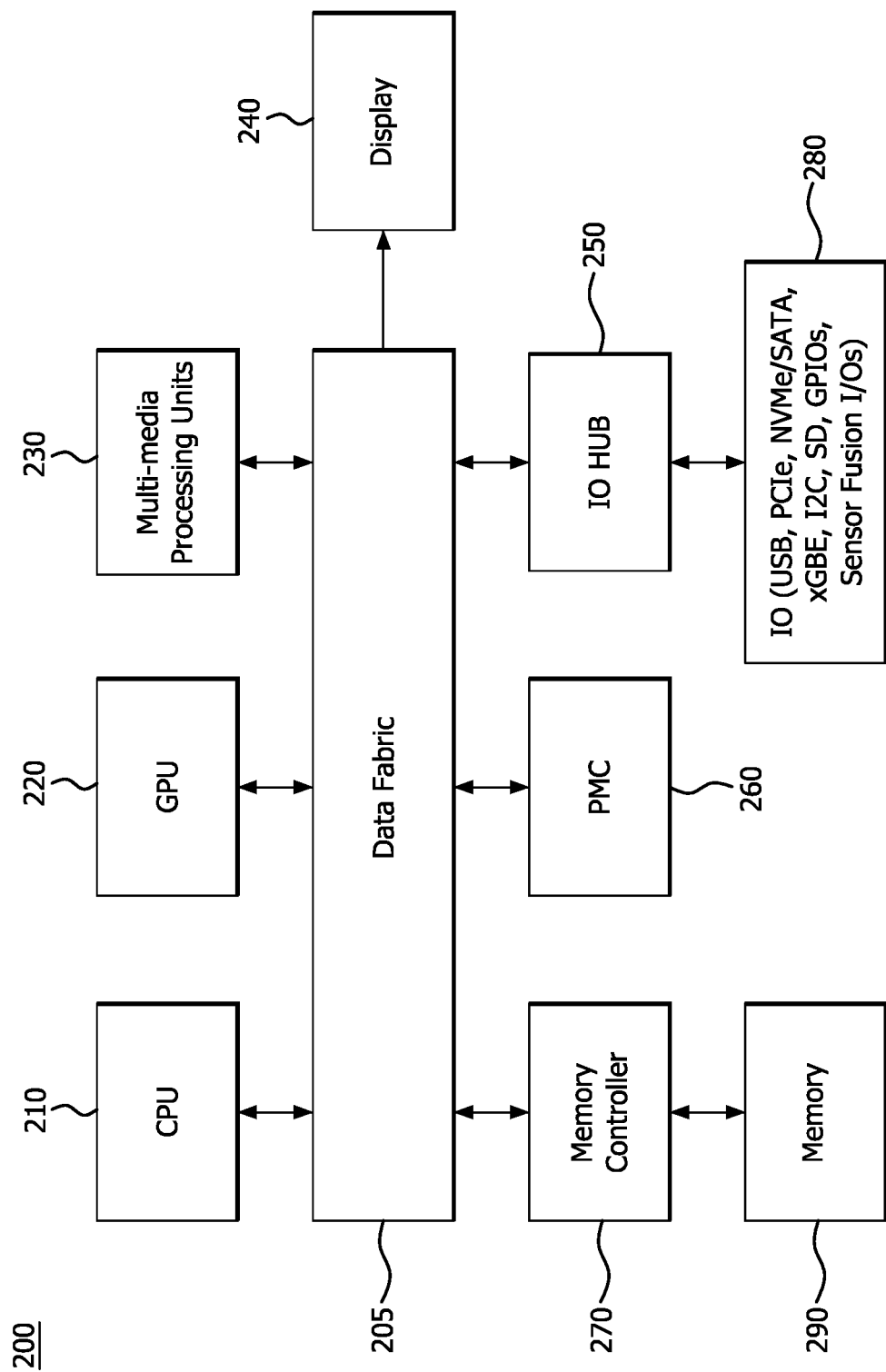
FIG. 2 is a block diagram illustrating example components, including a power management controller, for implementing one or more features of the disclosure.

FIG. 2 is a block diagram illustrating example components of a device 200, including PMC 260, for implementing one or more features of the disclosure. The components of the example device 200 include data fabric 205, which is representative of any type of communication fabric, bus, and/or other control and interface logic for communicating data between intellectual property (IP) components (referred to herein as "IP components) of a device. IP components include, for example, cores, hardware blocks, memory cells and logic used to execute various portions of a program or application. Data fabric 205 includes data paths, switches, routers, and other logic used to communicate data among the various IPs, such as CPU 210, GPU 220, multi-media processing units 230, display 240 (via a display controller 240 shown in FIG. 3), I/O hub 250 and memory controller 270. Data fabric 205 can be bus-based, including shared bus configurations, crossbar configurations, and hierarchical buses with bridges. Data fabric 205 can also be packet-based, and can be hierarchical with bridges, crossbar, point-to-point, or other interconnects. The arrows in FIG. 2 show the data flow between the IP components of the device.

The components of the device 200 shown in FIG. 2 also include various I/O components 280, such as for example, a universal serial bus (USB) port, a peripheral component interconnect express (PCIe) bus, a NVMe controller, a general-purpose input/output (GPIO) controller and sensor fusion I/O components.

As described in more detail below with regard to FIG. 3, PMC 260 includes a combination of hardware and firmware and interfaces with the IP components (e.g., CPU 210, GPU 220, multi-media processing units 230, display 240, I/O hub 250, and memory controller 270) via IP component control interfaces and register bus interfaces (different from the data fabric interfaces used to communicate data between IP components) to manage the transitions (e.g., entry and exit) between different powers states of a device.

Figure 3:
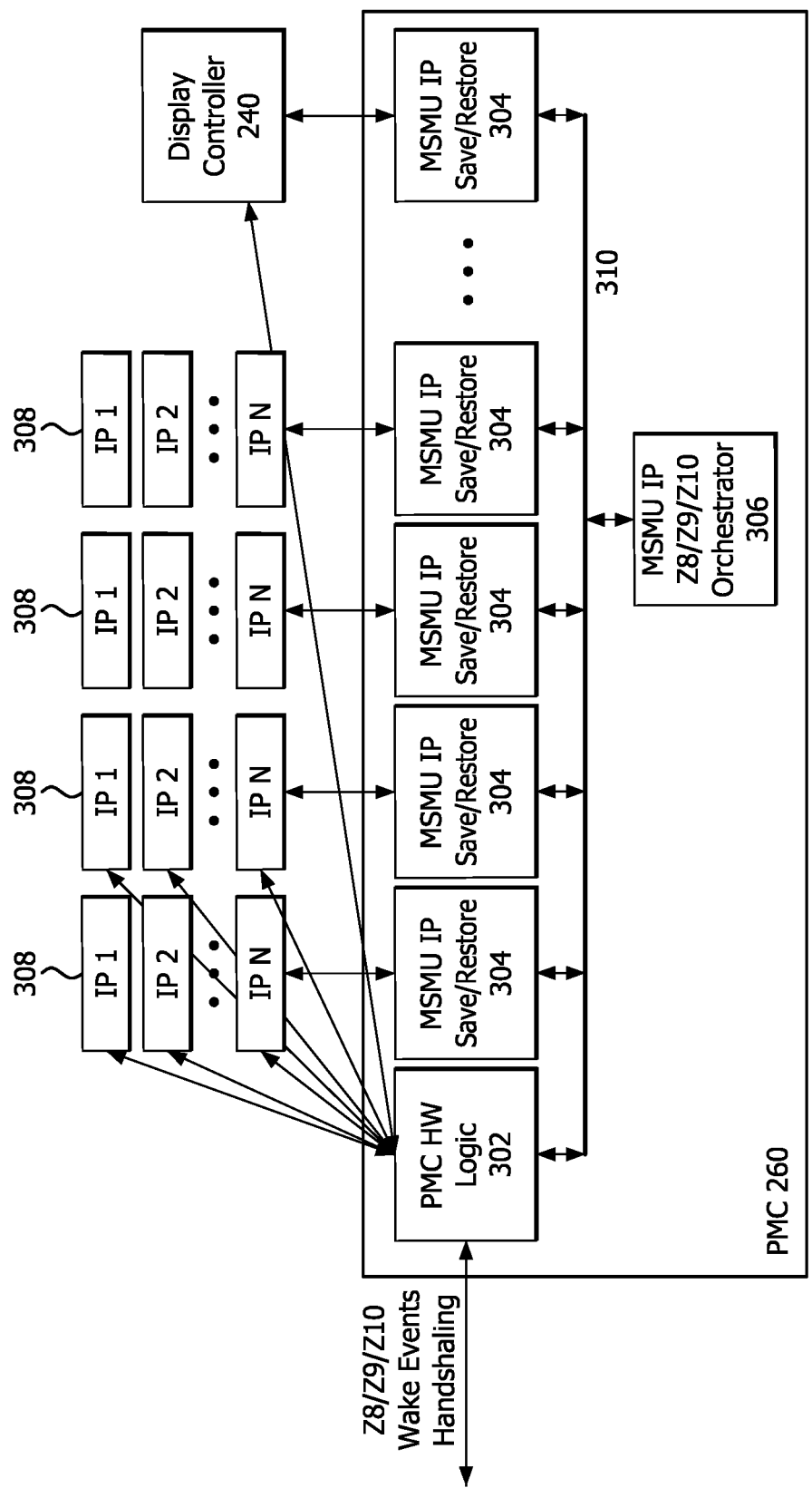
FIG. 3 is a block diagram illustrating the power management controller shown in FIG. 2 with additional detail.
Figure 5:
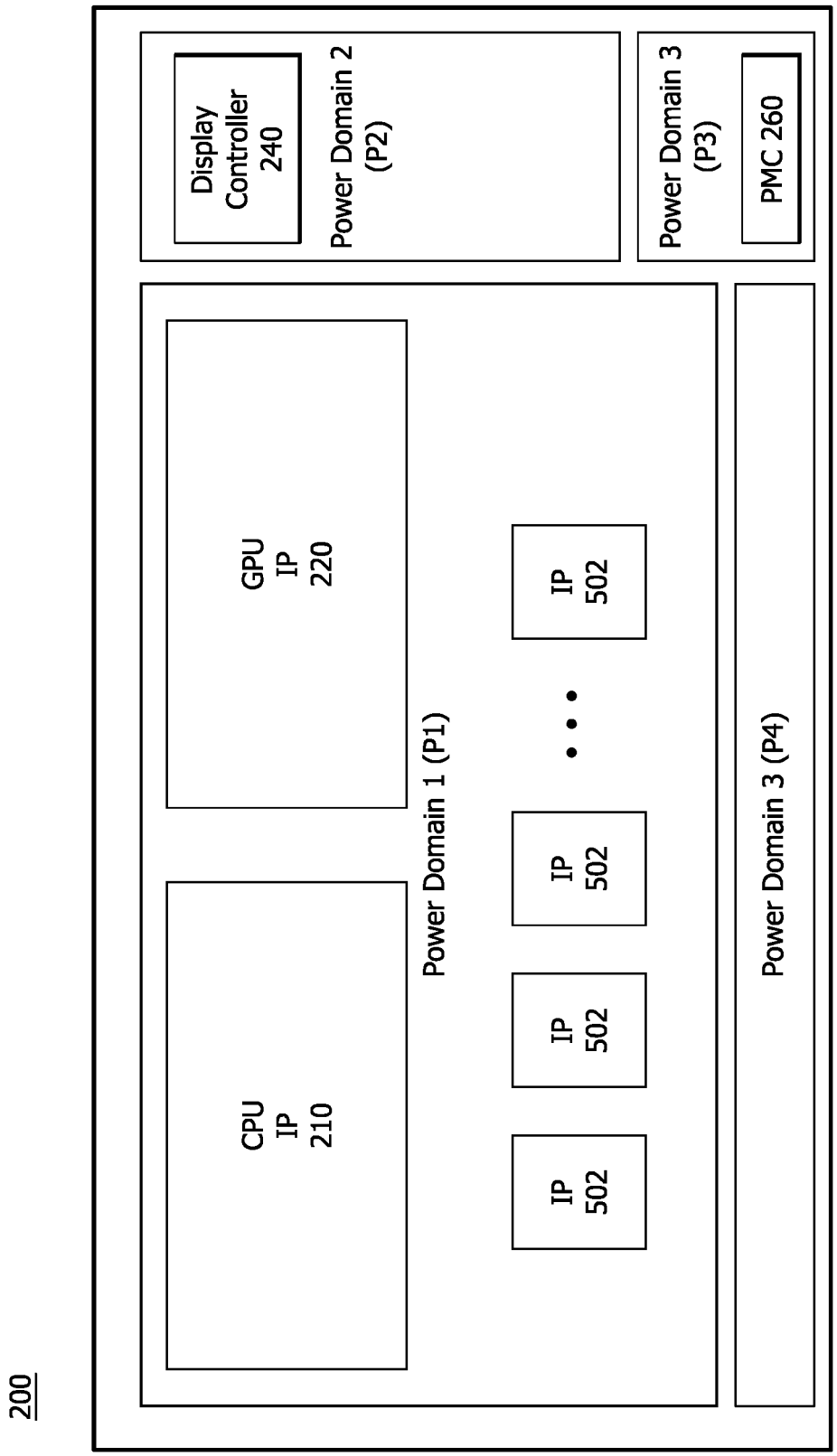
FIG. 5 is a block diagram illustrating different power domains of an example device in which one or more features of the disclosure can be implemented.

FIG. 3 is a block diagram illustrating components of PMC 260 in communication with a plurality of IP components 308. As shown in FIG. 3, the PMC 260 includes PMC hardware (HW) logic 302, IP Save/Restore middle system management units (MSMUs) 304, and main MSMU 306. PMC HW logic 302 is a hardware block (i.e., logic circuitry) which interfaces with IP components 308 (in the P1 and P2 power domains as shown in FIG. 5) according to an IP/PMC interface protocol. For example, the PMC HW logic 302 receives idleness indications of whether one or more of the IP components 308 are idle or are not idle (e.g., wake event) and performs handshaking (e.g., sends fence requests to one or more IP components 308 and receives fence acknowledgements from the one or more IP components 308).

Figure 4:
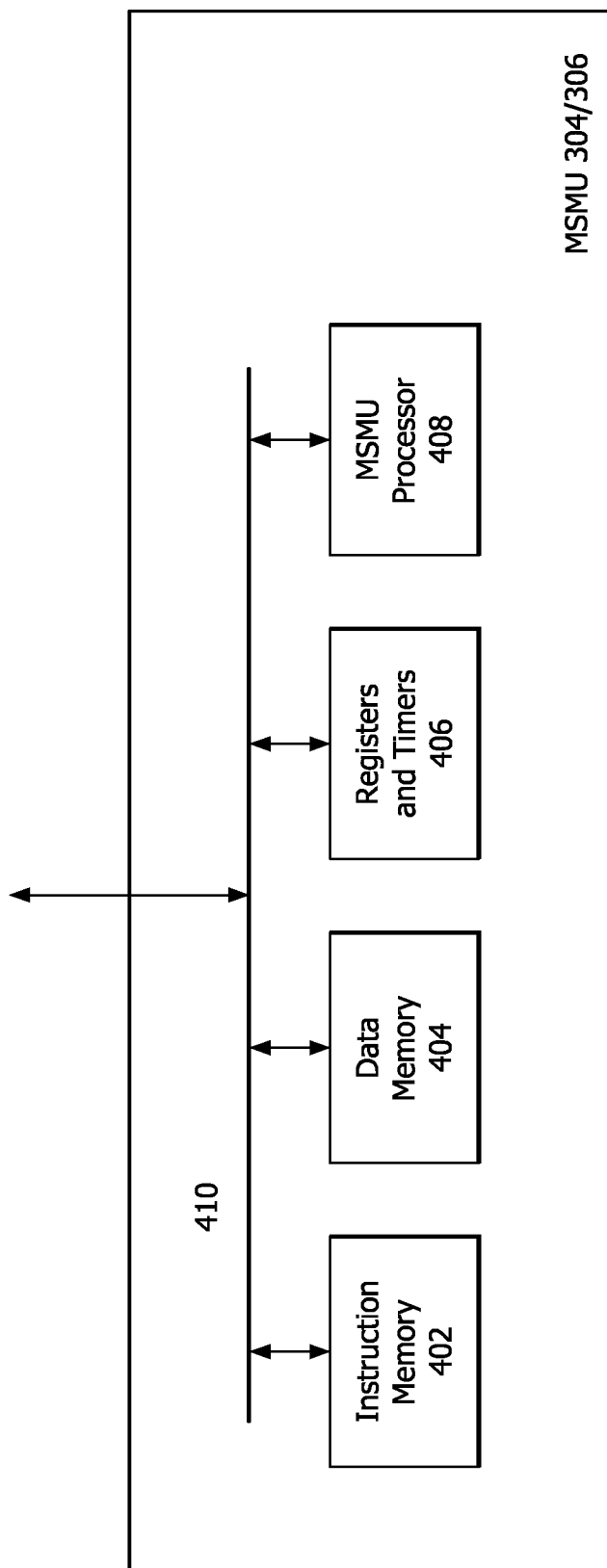
FIG. 4 is a block diagram illustrating components of a middle system management unit for implementing one or more features of the disclosure.

FIG. 4 is a block diagram illustrating components of the MSMUs 304 and 306 shown in FIG. 3. As shown in FIG. 4, the MSMUs 304 and 306 include instruction memory 402, data memory 404, registers and timers 406, instruction processor 408 and MSMU bus 410. The IP Save/Restore MSMUs 304 operate in parallel to save register data of corresponding IP components 308 in their data memory 404 and restore the register data to corresponding IP components 308 from their data memory 404.

Each MSMU processor 408 executes firmware instructions in its instruction memory 402 to save and restore the register data for its corresponding IP components 308. The instruction memory 402 includes a limited set of firmware instructions (e.g., 16 instructions) which are used to efficiently implement the register save-restore traffic (e.g., meet target latency periods between a time in which one or more IP components 308 becomes active (i.e., not idle) and a time to restore one or more IP components 308 the device 200 to an active state. The data memory 404 includes dynamic random access memory (DRAM) and static random access memory (SRAM) which are used to store data used by a corresponding IP component 308 to execute a portion of a program. The data is saved to the data memory 404 from configuration registers assigned to an IP component 308 when exiting a power state of the device 200 and restored (e.g., reloaded) to the configuration registers when entering a power state of the device 200.

The main MSMU 306 communicates with the IP Save/Restore MSMUs 304 and PMC HW logic 302 via PMC bus 310 and includes firmware instructions which are used to manage the IP Save/Restore MSMUs 304 and orchestrate the implementation of the register save-restore traffic between the IP Save/Restore MSMUs 304 and their corresponding IP components 308.

FIG. 5 is a block diagram illustrating the different power domains of the example device 200. As shown in FIG. 5, the IP components in the first power domain (P1) include CPU 210, GPU 220 and other IP components 502, such as for example multi-media processing units 230, I/O hub 250, and memory controller 270. The second power domain (P2) includes display controller 240. The third power domain (P3) includes PMC 260. The fourth power domain (P4) includes other components of device 200, such as I/O components 280.

The power states of the device 200 include, for example, 11 states ranging from Z0 (also referred to as state S0) to Z10. Features of the present disclosure can be implemented, however, for any number of power states. During the S0/Z0 power state, power is provided to each of the domains (e.g., each power rail is ON). During the Z1-Z7 states, one or more, but not each of the IP components are idle. During the Z8 and Z9 power states, CPU 210, GPU 220 and IP components 502 are idle. During the Z8 power state, power (e.g., voltage) supplied to the P1 power domain is reduced for limited functionality (e.g., display stutter). During the Z9 state, power is not supplied (i.e., power is OFF) to the P1 power domain. During the Z10 state, power is not supplied to the P1 and P2 power domains.

Figure 6:
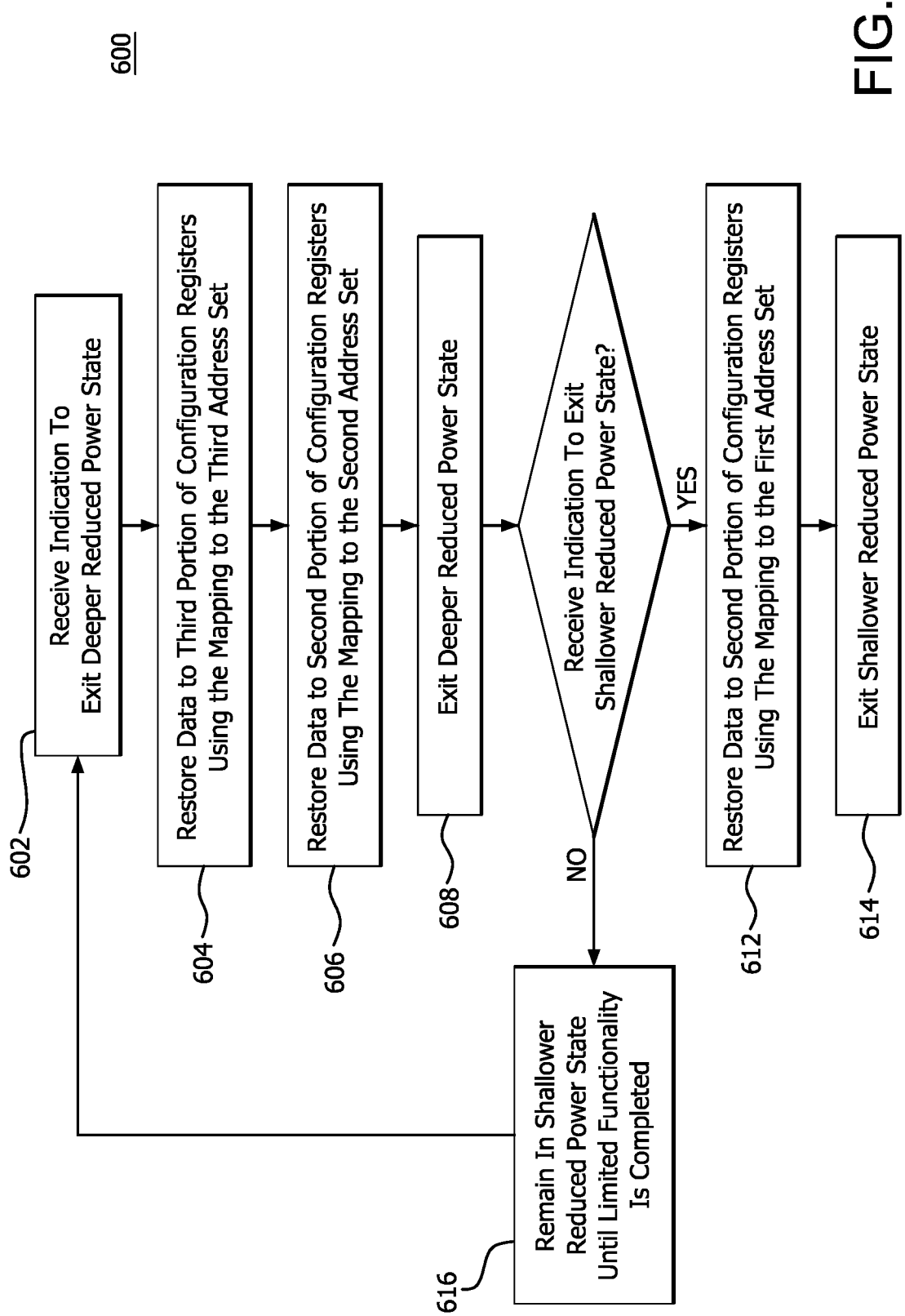
FIG. 6 is a flow diagram illustrating an example method of using linear addressing to exit deeper and shallower reduced power states according to features of the present disclosure.
Figure 7:
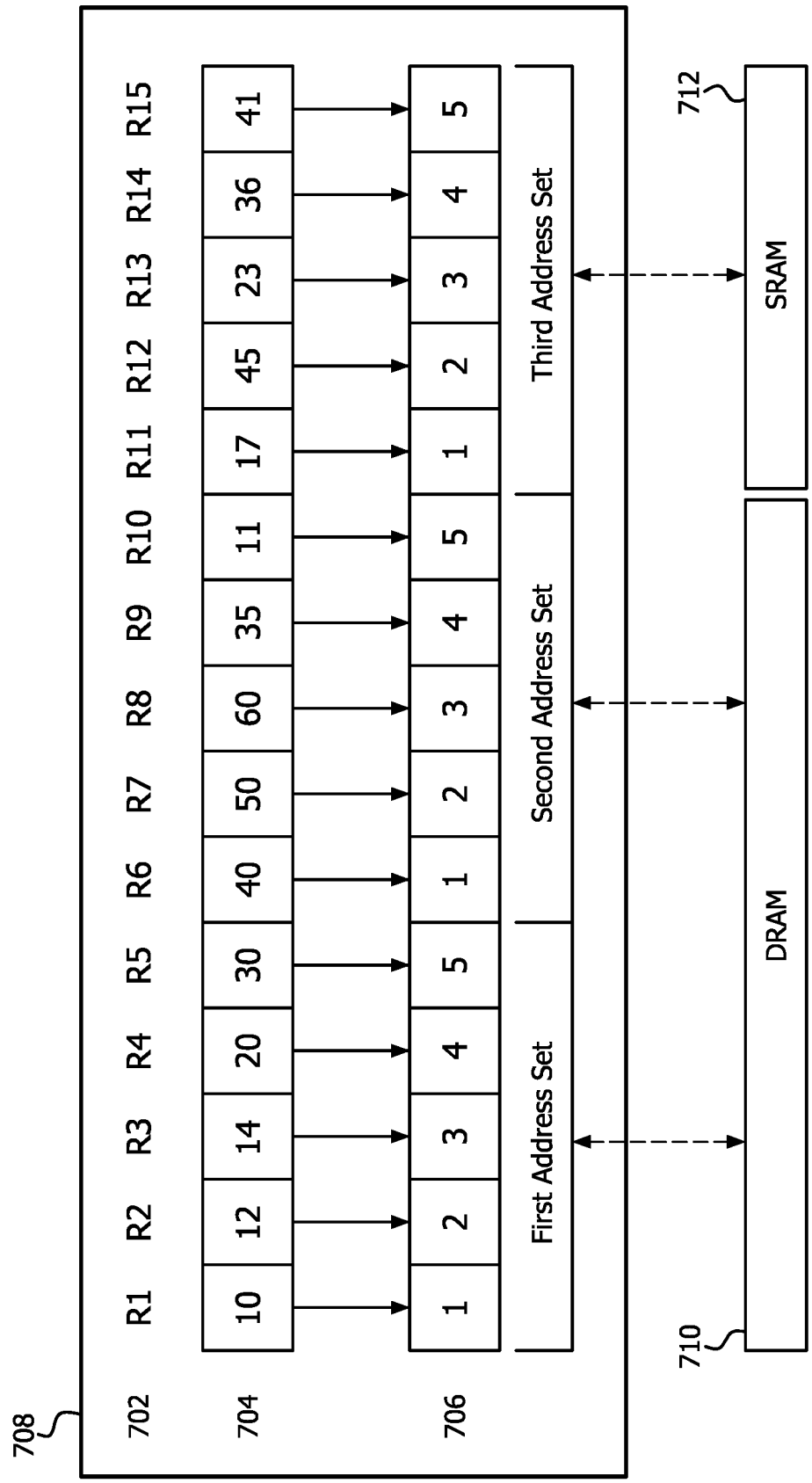
FIG. 7. is a diagram illustrating an example of mapping assigned configuration registers to first, second and third sets of linear address spaces and the data flow between memory and the configuration registers.

FIGS. 6 and 7 are used together to describe an example method of using linear addressing according to features of the present disclosure. FIG. 6 is a flow diagram illustrating an example method 600 of using linear addressing to restore the data to portions of configuration registers assigned to a component 708 (e.g., CPU 210 shown in FIG. 2) during transitioning between power states. FIG. 7. is a diagram illustrating an example of mapping portions of assigned configuration registers 702 to first, second and third sets of contiguous addresses hardcoded in a linear address space and the data flow between memory and the configuration registers.

As shown in the example in FIG. 7, there are 15 configuration registers 702 assigned to a component 708. The component 708 is, for example, one of the components shown in FIG. 2, such as CPU 210, GPU 220, multi-media processing units 230, display 240, I/O hub 250 and memory controller 270. FIG. 7 also includes DRAM 710 and SRAM 712. DRAM 710 is, for example, part of main memory or part of cache memory. SRAM 712 is, for example, a portion cache memory or another type of high speed memory. SRAM 712 represents a portion of the memory to which power continues to be supplied throughout each of the reduced power states, as described above.

Each register 702 has an assigned register address 704, which is assigned to the component 708 according to a specification or standard and is hardcoded at the component 708 for a corresponding register 702. In addition, each register 702 is provided with an additional address 706 which is also hardcoded at the component 708 for a corresponding register 702. The first 5 contiguous addresses (1-5) are hardcoded, along with assigned register addresses 10, 12, 14, 20 and 30, at the component 708 and correspond to a first portion of the registers R1-R5. The next 5 contiguous addresses (1-5) of the second address set are addresses hardcoded, along with assigned register addresses 40, 50, 60, 35 and 11, at the component 708 and correspond to a second portion of the registers R6-R10. The last 5 contiguous addresses (1-5) of the third address set are contiguous addresses hardcoded, along with assigned register addresses 17, 45, 23, 36 and 41, at the component 708 and correspond to a third portion of the registers R11-R20.

Each assigned register addresses 704 is mapped, at compiling, to a corresponding additional address 706. The mapping is indicated by the solid arrows in FIG. 7. The assigned register addresses 704 for the first portion of the registers (i.e., portion corresponding to the first 5 registers R1-R5 shown in FIG. 7) are mapped to a first set of contiguous addresses 1-5 (i.e., a first address set of linear address space). For example, assigned register address 10 is mapped to linear address 1 of the first address set, assigned register address 12 is mapped to linear address 2 of the first address set, assigned register address 14 is mapped to linear address 3 of the first address set, assigned register address 20 is mapped to linear address 4 of the first address set and register address 30 is mapped to linear address 5 of the first address set.

The data in the first and second portions of the registers 702 (i.e., registers R1-R10) is stored to the DRAM 710 and restored to the first and second portions of the registers 702 from the DRAM 710, as indicated by the two dashed arrows on the left in FIG. 7. Data in the third portion of the registers (i.e., registers R11-R15) is stored to the SRAM 712 and restored to the third portions of the registers 702 from the SRAM 712, as indicated by the dashed arrow on the right in FIG. 7. The data stored to the SRAM 712 from the third portion of the registers, which is mapped to the third address set, is the data which is used by the processor (e.g., a power management controller) to correctly and reliably save the data from the first 2 portions of registers (i.e., R1-R10 in this example) to the DRAM 710 and restore the data from the DRAM 710 to the first and second portions of the configuration registers.

Each address 706 of the first address set, the second address set and the third address set includes an identifier, which indicates that the address is part of the contiguous set of 5 addresses of either the first address set the second address set or the third address set. The total number of registers and the number of registers in each portion of registers shown in FIG. 7 is merely an example used for simplification purposes. Features of the present disclosure can be implemented using any number of registers assigned to a component and using any number of registers as part of a portion of registers assigned to a component.

In the example method shown in FIG. 6, it is assumed that the data of the first portion of registers (i.e., R1-R5 in FIG. 7) was previously saved to DRAM 710 using the mapped contiguous addresses 1-5 of the first address set, the data of the second portion of registers (i.e., R6-R10 in FIG. 7) was previously saved to DRAM 710 using the mapped contiguous addresses 1-5 of the second address set and the data of the third portion of registers (i.e., R11-R15 in FIG. 7) was previously saved to SRAM 712 using the mapped contiguous addresses 1-5 of the third address set. In addition, it is assumed that the assigned addresses 704 were previously mapped, at compiling, to the contiguous addresses of the first, second and third address sets of linear address space.

As shown at block 602, the method 600 includes receiving an indication to exit the deeper reduced power state (e.g., Z10 reduced power state). For example, the hardware logic 302 of the PMC 260 receives an indication that one or more components (e.g., CPU 210 in FIG. 2), including component 708, are no longer idle and that the device should exit the Z10 reduced power state in which power is not supplied to the P1 power domain, which includes the IP component 308, and the P2 power domain.

As shown at block 604, the method 600 includes restoring data to the third portion of the configuration registers (R11-R15 in FIG. 7) using the mapping to the third address set of the linear address space. That is, the data is restored from SRAM 712 to the third portion of configuration registers (R11-R15 in FIG. 7) using the mapping of the assigned addresses 704 of the third portion of the configuration registers R11-R15 in FIG. 7, to contiguous addresses (1-5) of the third address set of the linear address space. The data of the third portion of configuration registers which is saved in the portion of SRAM 712 is used by the processor to correctly and reliably save the data from the first and second portions of configuration registers (R1-R10 in FIG. 7) to DRAM 710 and restore the data from SRAM 712 to the first and second portions of configuration registers. As described above, the data in the first and second portions of the configuration registers are not saved to SRAM 712. Accordingly, the cost (e.g., area and power consumption) associated with SRAM 712 access is reduced. the data in the first and second portions of the configuration registers are not saved to SRAM 712.

As shown at block 606, the method 600 includes restoring data to the second portion of the configuration registers (R6-R10 in FIG. 7) using the mapping to the second address set of the linear address space. That is, the data is restored from DRAM 710 to second portion of the configuration registers using the mapping of the assigned addresses 704 of the second portion of the configuration registers to contiguous addresses (1-5) of the second address set of the linear address space.

As shown at block 608, the method 600 includes exiting the deeper reduced power state (e.g., Z10 reduced power state). For example, the device exits the deeper reduced power state and proceeds to a shallower reduced power state (e.g., Z1-Z9 power states).

As shown at decision block 610, the method 600 includes determining whether an indication, to exit the shallower reduced power state, is received. When the shallower reduced power state is a state in which power is not supplied (i.e., power is OFF) to the IP components 308 in the P1 power domain (shown in FIG. 5), but is supplied to the display controller 240 in the P2 power domain (e.g., Z9 power state), an indication to exit the shallower reduced power state is received (YES decision). For example, when the device is in the Z9 power state, the hardware logic 302 of the PMC 260 receives an indication that an additional one or more components (e.g., one or more IP components 308) are no longer idle and that the device should exit the Z9 power state As shown at block 612, the method 600 includes restoring data to the first portion of the configuration registers (R1-R5 in FIG. 7) using the mapping to the first address set of the linear address space. That is, the data is restored from DRAM 710 to first portion of the configuration registers using the mapping of the assigned addresses 704 of the first portion of the configuration registers to the first address set in the linear address space. The device then exits the shallower reduced power state at block 614.

Alternatively, when the shallower reduced power state is a state in which power (e.g., voltage) is supplied to the P1 power domain, but the power is reduced (e.g., Z8 power state, with limited functionality, such as a display stutter mode), an indication to exit the shallower reduced power state is not received (NO decision) by the PMC 260. Accordingly, the values of the first portion of configuration registers (e.g., R1-R5 in FIG. 7) mapped to the first linear address are not restored and, instead, the device remains in the shallower reduced power state until the limited functionality is completed, as shown at block 616. The device then returns to the deeper reduced power state and proceeds back to block 602.

For the process of saving the configuration register state for a component (e.g., component 708), and entering a shallower reduced power state and entering a deeper reduced power state, the flow of the method shown in FIG. 6 is performed in reverse. For example, data of the configuration registers mapped to the first address set are saved and the device enters the shallower reduced power state (e.g., from an active state). Then, after entering the shallower reduced power state, a determination is made as to whether to exit the shallower reduced power state without proceeding to the deeper state or to save the data of the configuration registers mapped to the second and third linear address sets and proceed to the deeper state. For example, when an indication is received that one or more components are active, then the device exits the shallower sate and returns to an active state. When no indication is received that one or more components are active, the data of the second portion of configuration registers mapped to the second address set is restored. Then, the data of the third portion configuration registers mapped to the third address set is restored and the device enters the deeper reduced power state.

Features of the present disclosure can be implemented by including additional linear addresses (i.e., addresses in addition to the second and third addresses used) for additional deeper reduced power states. For example, if the device enters or exits another deeper reduced power state (e.g., Z11 reduced power state, a portion (i.e., not all) of the configuration registers is mapped to a fourth address of the linear address space.

The various functional units illustrated in the figures and/or described herein (including, but not limited to, the processor 102, the input driver 112, the input devices 108, the output devices 110, the output driver 114, data fabric 205, CPU 210, GPU 220, memory controller 270 and PMC 260 may be implemented as a general purpose computer, a processor, or a processor core, or as a program, software, or firmware, stored in a non-transitory computer readable medium or in another medium, executable by a general purpose computer, a processor, or a processor core. The methods provided can be implemented in a general purpose computer, a processor, or a processor core. Suitable processors include, by way of example, a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Arrays (FPGAs) circuits, any other type of integrated circuit (IC), and/or a state machine. Such processors can be manufactured by configuring a manufacturing process using the results of processed hardware description language (HDL) instructions and other intermediary data including netlists (such instructions capable of being stored on a computer readable media). The results of such processing can be maskworks that are then used in a semiconductor manufacturing process to manufacture a processor which implements features of the disclosure.

The methods or flow charts provided herein can be implemented in a computer program, software, or firmware incorporated in a non-transitory computer-readable storage medium for execution by a general purpose computer or a processor. Examples of non-transitory computer-readable storage mediums include a read only memory (ROM), a random access memory (RAM), a register, cache memory, semiconductor memory devices, magnetic media such as internal hard disks and removable disks, magneto-optical media, and optical media such as CD-ROM disks, and digital versatile disks (DVDs).

What is claimed is:

1. A processing device comprising:
    memory;
    a component, having assigned configuration registers, configured to execute a program using data stored in the configuration registers; and
    a power management controller configured to:
        for a first reduced power state, save data of a first portion of the configuration registers to the memory using a set of addresses of a first linear address space; and
        for a second reduced power state:
            save data of a second portion of the configuration registers to the memory using a set of addresses of a second linear address space separate from the first linear address space; and
            save data of a third portion of the configuration registers to the memory using a set of addresses of a third linear address space separate from the first linear address space and the second linear address space.

2. The processing device of claim 1, wherein the memory comprises dynamic random access memory (DRAM) and static random access memory (SRAM),
    the data of the first portion of the configuration registers, mapped to the set of addresses of the first linear address space, is saved to DRAM and restored from DRAM to the first portion of the configuration registers,
    the data of the second portion of the configuration registers, mapped to the set of addresses of the second linear address space, is saved to DRAM and restored from DRAM to the second portions of the configuration registers, and
    the data of the third portion of the configuration registers, mapped to the set of addresses of the third linear address space, is saved to a portion of the SRAM to which power continues to be supplied during the first and second reduced power states.

3. The processing device of claim 2, wherein
    the data of the third portion of the configuration registers, which is mapped to the set of addresses of the third linear address space and saved to the portion of the SRAM, is used to save the data of the first and second portions to the DRAM and restore the data of the first and second portions from the DRAM to the first and second portions of the configuration registers.

4. The processing device of claim 1, wherein the data of the third portion of the assigned configuration registers comprises data related to at least one of routing tables, flow control, reliability accessibility serviceability (RAS) configuration and address maps.

5. The processing device of claim 1, wherein the data of the first portion of the configuration registers is mapped, at compiling, to the set of addresses of the first linear address space, the second portion of the configuration registers is mapped, at compiling, to the set of addresses of the second linear address space and the third portion of the configuration registers is mapped, at compiling, to the set of addresses of the third linear address space.

6. The processing device of claim 1, wherein the processing device includes a display and the first reduced power state is a shallower reduced power state in which one of:
  power is supplied to the assigned configuration registers, except to a display controller which controls the display; and
  an amount of the power supplied to the assigned configuration registers is less than an amount of the power supplied to the assigned configuration registers in the shallower reduced power state; and
the second reduced power state is a deeper reduced power state in which power is not supplied to the assigned configuration registers.

7. The processing device of claim 1, wherein the power management controller comprises:
  logic circuitry, which interfaces with a plurality of components of the processing device, and receives indications of whether or not one or more components of the processing device are idle.

8. The processing device of claim 7, wherein, the power management controller is configured to:
  save the data of the first, second and third portions of configuration registers to a portion of memory local to the power management controller.

9. The processing device of claim 1, wherein, for a process of entering the first and second reduced power states, the power management controller is configured to:
  enter the first reduced power state by saving the data of the first portion of the configuration registers to the memory using the set of addresses of the first linear address space;
  after entering the first reduced power state, save the data of the second portion of the configuration registers to the memory using the set of addresses of the second linear address space; and
  enter the second reduced power state by saving the data of the third portion of the configuration registers using the set of addresses of the third linear address space after saving the data of the second portion of the configuration registers to the memory.

10. The processing device of claim 1, wherein the set of addresses of the first linear address space are contiguous addresses, the set of addresses of the second linear address space are contiguous addresses, and the set of addresses of the third linear address space are contiguous addresses.

11. A method of transitioning between power states of a device comprising:
  executing a program using data stored in configuration registers;
  for a first reduced power state, saving data of a first portion of configuration registers to memory using a set of addresses of a first linear address space; and
  for a second reduced power state:
    saving data of a second portion of the configuration registers to the memory using a set of addresses of a second linear address space separate from the first linear address space; and
    saving data of a third portion of the configuration registers to the memory using a set of addresses of a third linear address space separate from the first linear address space and the second linear address space,
  wherein the configuration registers are assigned to a component of the device.

12. The method of claim 11, wherein
the data of the first portion of the configuration registers, mapped to the set of addresses of the first linear address space, is saved to dynamic random access memory (DRAM) of the memory and restored from DRAM to the first portion of the configuration registers,
the data of the second portion of configuration registers, mapped to the set of addresses of the second linear address space, is saved to DRAM and restored from DRAM to the second portion of configuration registers, and
the data of the third portion of the configuration registers, mapped to the set of addresses of the third linear address space, is saved to a portion of static random access memory (SRAM) to which power continues to be supplied during the first and second reduced power states.

13. The method of claim 12, wherein
the data of the third portion of the configuration registers, which is mapped to the set of addresses of the third linear address space and saved to the portion of the SRAM, is used to save the data of the first and second portions to the DRAM and restore the data of the first and second portions from the DRAM to the first and second portions of the configuration registers.

14. The method of claim 11, wherein the data of the third portion of the configuration registers comprises data related to at least one of routing tables, flow control, reliability accessibility serviceability (RAS) configuration and address maps.

15. The method of claim 11, further comprising:
  mapping, at compiling:
  the first portion of the configuration registers to the set of addresses of the first linear address space;
  the second portion of the configuration registers to the set of addresses of the second linear address space; and
  the third portion of the configuration registers to the set of addresses of the third linear address space.

16. The method of claim 11, wherein
the first reduced power state is a shallower reduced power state in which one of:
  power is supplied to the configuration registers, except to a display controller which controls a display; and
  an amount of the power supplied to the configuration registers is less than an amount of the power supplied to the configuration registers in the shallower reduced power state; and
the second reduced power state is a deeper reduced power state in which power is not supplied to the configuration registers.

17. The method of claim 11, further comprising:
  entering one of the first reduced power state and the second reduced power state when receiving an indication that the component is idle; and
  saving, by a power management controller, the data of the configuration registers to the set of addresses of the first linear address space, the set of addresses of the second linear address space and set of addresses of the third linear address space.

18. The method of claim 11, further comprising, for a process of exiting the first and second reduced power states:
  exiting the second reduced power state by:
    restoring the data of the third portion of the configuration registers using the set of addresses of the third linear address space;
    restoring the data of the second portion of the configuration registers using the set of addresses of the second linear address space after restoring the data to the third portion of the configuration registers; and exiting the first reduced power state by restoring the data to the first portion of the configuration registers using the set of addresses of the first linear address space after restoring the data to the second portion of the configuration registers.

19. The method of claim 11, further comprising, for a process of entering the first and second reduced power state:

entering the first reduced power state by saving the data of the first portion of the configuration registers to the memory using the set of addresses of the first linear address space;

after entering the first reduced power state, saving the data of the second portion of the configuration registers to the memory using the set of addresses of the second linear address space; and entering the second reduced power state by saving the data of the third portion of the configuration registers using the set of addresses of the third linear address space after saving the data of the second portion of configuration registers to the memory.

20. A non-transitory computer readable medium comprising instructions for causing a computer to execute a method of transitioning between power states of a device, the instructions comprising:

executing a program using data stored in configuration registers;

for a first reduced power state, saving data of a first portion of configuration registers to memory using a set of addresses of a first linear address space; and for a second reduced power state:

saving data of a second portion of the configuration registers to the memory using a set of addresses of a second linear address space separate from the first linear address space; and saving data of a third portion of the configuration registers to the memory using a set of addresses of a third linear address space separate from the first linear address space and the second linear address space, wherein the configuration registers are assigned to a component of the device.

21. The non-transitory computer readable medium of claim 20, wherein the data of the first portion of the configuration registers, mapped to the set of addresses of the first linear address space, is saved to dynamic random-access memory (DRAM) and restored from DRAM to the first portion of the configuration registers, the data of the second portion of the configuration registers, mapped to the set of addresses of the second linear address space, is saved to the DRAM and restored from the DRAM to the second portion of the configuration registers, and the data of the third portion of configuration registers, mapped to the set of addresses of the third linear address space, is saved to a portion of static random access memory (SRAM) to which power continues to be supplied during the first and second reduced power states.

* * * * *